(12) United States Patent
deGroot

(10) Patent No.: US 7,177,029 B2
(45) Date of Patent: Feb. 13, 2007

(54) STROBOSCOPIC INTERFEROMETRY WITH FREQUENCY DOMAIN ANALYSIS

(75) Inventor: Peter J. deGroot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 288 days.

(21) Appl. No.: 10/887,409

(22) Filed: Jul. 8, 2004

(65) Prior Publication Data

US 2005/0007599 A1    Jan. 13, 2005

Related U.S. Application Data

(60) Provisional application No. 60/486,204, filed on Jul. 10, 2003.

(51) Int. Cl.
*G01B 11/02* (2006.01)
(52) U.S. Cl. ............................... 356/497; 356/511
(58) Field of Classification Search ........... 356/497, 356/498, 511, 512, 516
See application file for complete search history.

(56) References Cited

U.S. PATENT DOCUMENTS

| | | | |
|---|---|---|---|
| 5,398,113 A | 3/1995 | deGroot | |
| 5,402,234 A | 3/1995 | Deck | |
| 5,841,030 A * | 11/1998 | Honsberg et al. | 73/579 |
| 6,219,145 B1 | 4/2001 | Gutierrez et al. | |

OTHER PUBLICATIONS

Marcheski, J.S., "Stroboscopic interferometer", Applied Optics, vol. 18, Jul. 15, 1979, p. 2368-2371 (1979).

Williams, Rick A., et al., "Stroboscopic phase-shifting interferometry" Optics Letters (ISSN 0146-9592), vol. 12, pp. 855-857 (1987).

Ketabchi, Mehrdad, et al., "Stroboscopic interferometry of high-speed scanning mirrors" Proc. SPIE vol. 1987, p. 212-220, (Dec. 1993).

Nakano, K., et al., Visualization of high-frequency surface acoustic wave propagation using stroboscopic phase-shift interferometry (Paper #: 3225-05) SPIE Proceedings vol. 3225 Microlithography and Metrology in Micromachining III ISBN: 0-8194-2657-1, 142 pages (1997).

de Groot, Peter J., "Signal modeling for modern interference microscopes", Proc. SPIE vol. 5457, p. 26-34, Optical Metrology in Production Engineering (Sep. 2004).

* cited by examiner

*Primary Examiner*—Gregory J. Toatley, Jr.
*Assistant Examiner*—Michael A. Lyons
(74) *Attorney, Agent, or Firm*—Francis J. Caufield

(57) ABSTRACT

A computer-based stroboscopic interferometric microscope system for measuring the topography of a microscopic vibratory object includes an interferometric microscope equipped with a multiple-color (e.g., LED) or white-light source, a mechanical scanning apparatus for varying the optical path difference between the vibratory object and a reference surface, a camera having a two-dimensional detector array, and digital signal processing apparatus for determining surface height from interference data. Interferograms for each of the detector image points in the field of view are generated simultaneously by scanning the object in a direction approximately perpendicular to the object surface illuminated stroboscopically while recording detector data in digital memory. Recorded interferograms for each image point are then transformed into the spatial frequency domain by Fourier analysis, and the surface height for each corresponding object surface point is obtained by examination of the complex phase as a function of spatial frequency. A complete three-dimensional image of the object surface is then constructed from the height data and corresponding image plane coordinates. The three-dimensional image may be presented on a display or hard copy or written to a storage medium.

10 Claims, 3 Drawing Sheets

STROBOSCOPIC INTERFEROMETRY WITH FREQUENCY DOMAIN ANALYSIS

CROSS REFERENCE TO RELATED APPLICATION

This application claims the benefit of priority from U.S. Provisional Patent Application No. 60/486,204 filed in the name of Peter J. deGroot on Jul. 10, 2003 with the title "STROBOSCOPIC INTERFEROMETRY WITH FREQUENCY DOMAIN ANALYSIS", the entire contents of which are incorporated herein by reference.

FIELD OF THE INVENTION

This invention relates generally to precision optical metrology instrumentation and methods for imaging and analysis of microscopic vibrating surfaces and, more particularly, to stroboscopic interferometric methods and stroboscopic interferometric microscope systems for three-dimensional topographical surface profiling of moving object surfaces.

BACKGROUND OF THE INVENTION

A stroboscope is a common tool for "freezing" the apparent motion e.g. of a vibration object. It produces the optical effect of stopping or slowing down an object to allow you to observe and analyze the object's motion.

Stroboscopic illumination has been applied in a variety of instruments, including interferometers (see, for example, Harris, J. S., Fusek, R. L., Dayton, University, Dayton, Ohio), AB; Marcheski, J. S., Dayton, University, Dayton, Ohio "Stroboscopic interferometer" Applied Optics, vol. 18, Jul. 15, 1979, p. 2368–2371 (1979); Kwon, Osuk Y., Shough, Dean M., Lockheed Missiles and Space Co., Inc., Research and Development Div., Palo Alto, Calif.), AB; Williams, Rick A., Lockheed Missiles and Space Co., Inc., Research and Development Div., Palo Alto, Calif. "Stroboscopic phase-shifting interferometry" Optics Letters (ISSN 0146–9592), vol. 12, p. 855–857 (1987); Marshall, Gerald F., Consultant in Optics; Shough, Dean, Kwon, Osuk Y., Lockheed Research and Development Div.; Ketabchi, Mehrdad, Vettese, Thomas, Speedring Systems, Inc. "Stroboscopic interferometry of high-speed scanning mirrors" Proc. SPIE Vol. 1987, p. 212–220, Recording Systems: High-Resolution Cameras and Recording Devices and Laser Scanning and Recording Systems, Leo Beiser; Reimar K. Lenz; Eds. (1993); Ken NAKANO, Kazuhiro HANE, Shigeru OKUMA and Tadashi EGUCHI "Visualization of high-frequency surface acoustic wave propagation using stroboscopic phase-shift interferometry (Paper #: 3225-05) SPIE Proceedings Vol. 3225 Microlithography and Metrology in Micromachining III ISBN: 0-8194-2657-1, 142 pages (1997); and Nakano K., Hane K., Okuma S., Eguchi T., "Visualization of 50 MHz surface acoustic wave propagation using stroboscopic phase-shift interferometry," Optical Review, vol. 4, number 2, p.265–269 (1997)). The most recent applications include vibrating MEMS devices, for which a stroboscopic or pulsating light source allows one to apply any one of several known surface profiling techniques based on interferometry, for example phase shifting interferometry.

One potential complication in applying stroboscopic illumination to an imaging interferometer is wavelength instability. Most interferometric systems depend on a stable wavelength, and may fail if the mean wavelength or other spectral properties of the source vary because of changes in environmental conditions or adjustments in illumination strength. In coherence-scanning interferometers, the fringe contrast envelope often must be assumed to be of a particular functional form, such as Gaussian, in order to be accurate; and distortions of this envelope shape due to surface colors or unexpected or unusual source spectra can also lead to significant errors. For many candidate sources, such as LED's, the wavelength can drift significantly with temperature and operating current. The wavelength of a pulsed LED can be particularly unstable and dependent on duty cycle. In a conventional interferometer, a few nm change in effective wavelength on a sample having 100 mm steps could lead to several hundred nanometers of error. As Novak has observed (see Erik Novak, Der-Shen Wan, Paul Unruh, Joanna Schmit, "Dynamic MEMS Measurement Using a Strobed Interferometric System with Combined Coherence Sensing and Phase Information," Proceedings of American Society of Precision Engineering Winter Topical Meeting on Machines and Processes for Micro-scale and Meso-scale Fabrication, Metrology and Assembly, 104–107 (2003)), this is significantly higher than the noise floor of most optical profilers, which is generally a few nanometers or less. Combined phase and coherence sensing techniques are often more sensitive to wavelength errors, with print-through of the interference fringes when incorrect wavelengths are used.

Accordingly, it is a primary object of the present invention to provide a stroboscopic interferometric microscope system for measuring microscopic structures.

It is another object of this invention to provide a stroboscopic interferometric microscope system for measuring microscopic structures while being insensitive to changes in the wavelength of the stroboscopic pulses illuminating the structures.

It is yet another object of this invention to provide a stroboscopic interferometric microscope system for measuring microscopic structures using frequency-domain analysis (FDA).

Other objects of the invention will in part be obvious and in part will appear hereinafter when the following detailed description is read in connection with the accompanying drawings.

SUMMARY OF THE INVENTION

A computer-based stroboscopic interferometric microscope system for measuring the topography of a microscopic vibratory object includes an interferometric microscope equipped with a multiple-color (e.g., LED) or white-light source, a mechanical scanning apparatus for varying the optical path difference between the vibratory object and a reference surface, a camera having a two-dimensional detector array, and digital signal processing apparatus for determining surface height from interference data. Interferograms for each of the detector image points in the field of view are generated simultaneously by scanning the object in a direction approximately perpendicular to the object surface illuminated stroboscopically while recording detector data in digital memory The invention employs frequency-domain analysis (FDA) in combination with stroboscopic interferometry to overcome the issue of wavelength stability when using, e.g., a pulsed LED source. FDA obviates the need for wavelength stability by relating all surface height characteristics to the OPD scan rate, rather than the source wavelength.

Briefly, interferograms stored in a computer during a scan of optical path length are individually transformed into the spatial frequency domain by digital Fourier analysis. The transformed data now represents, for each pixel, the relative intensity and interferometric phase as a function of spatial frequency. In a next step, the spatial frequency data is examined to determine the mean wavelength and spectral distribution of the light that generated the interference pattern. In a next step, the interferometric phase as a function of wavenumber in the interferogram is approximated, preferably, by a least-squares polynomial fit to the transformed data. In a next step, heights for the surface points corresponding to the image pixels are calculated from the coefficients of the polynomial, including specifically, the rate of change of interference phase as a function of spatial frequency or wavenumber, a value that depends only on the surface height and OPD scan rate, independent of the spectral properties of the light source. The final step is the creation of a complete three-dimensional image constructed from the height data and corresponding image plane coordinates.

A significant and relevant benefit of FDA processing of stroboscopic interference data is that there need be no prior assumptions regarding the center wavelength, overall shape, symmetry or continuity of the optical spectrum.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION

Figure 1:
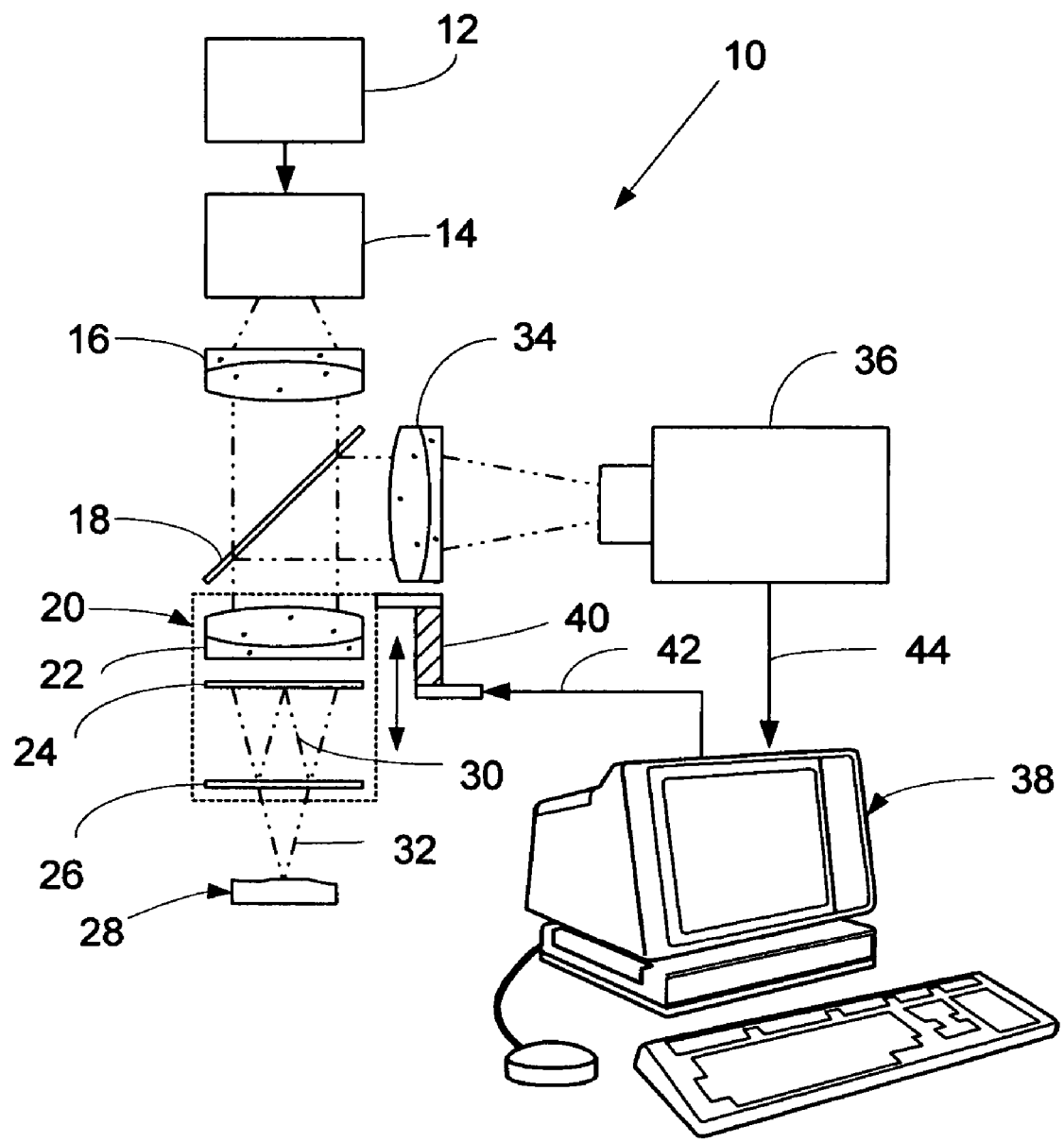
FIG. 1 is a diagrammatic elevational view of a computer-based stroboscopic microscope interferometer system employing FDA analsysis for data analysis.

Reference is now made to FIG. 1 which shows an embodiment of the computer-based, stroboscopic interferometric microscope system (the "system") of the invention employing FDA analysis to quantitatively measure the microscopic topography of a vibrating object such as, but not limited to, for example, a MEMS or SAW device.

Figure 2:
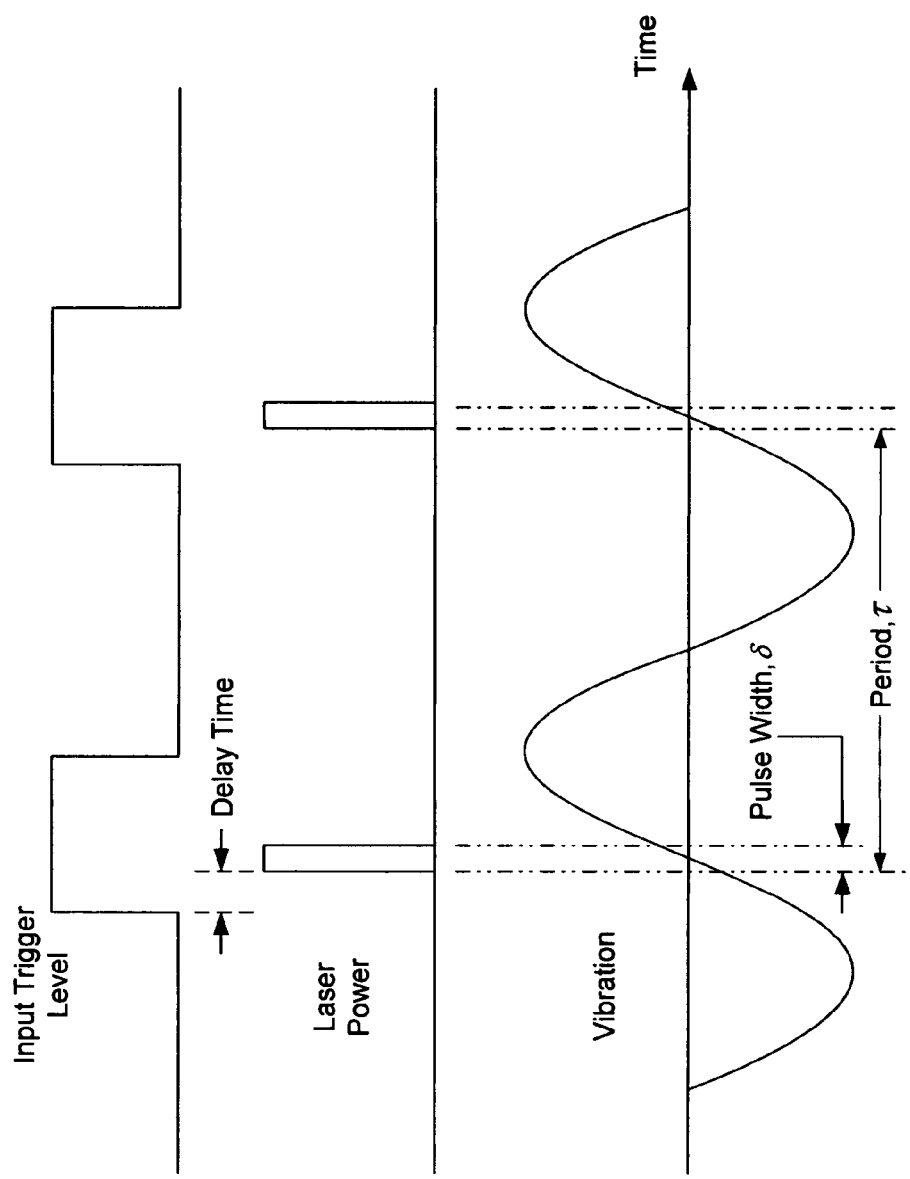
FIG. 2 is a diagrammatic graph showing strobe pulse width in relation to the period of oscillation of an object being measured.

As seen in FIG. 1, the inventive system, designated generally at 10, comprises a source 14 that is modulated by a signal generator 12, for example, an arbitrary waveform generator (AWG) to provide a series of pulses of illumination. For example, the embodiment of FIG. 1 supplies, e.g., a sequence of pulses of constant pulse width δ at a uniform spacing τ as shown in FIG. 2. The source 12 may be any suitable type capable of being modulated to provide pulses having durations that are sufficiently short to apparently "freeze" fringes. Suitable sources include light emitting diodes (LEDs), laser diodes (LDs), and white light sources. Preferably LEDs with spectral outputs in the visible region are employed with suitable duty cycles, but others of different spectral content may be beneficially employed.

The output from the modulated source 12 is passed through a collimating lens 16 to provide a collimated beam that passes through a 45-degree beamsplitter 18, exiting it to afterwards enter an interferometric objective designated generally at 20. The interferometric objective 20 may be, for example, of the Mirau or Fizeau type, depending on numerical aperture requirements. Resident in the interferometric objective 20 is an objective lens 22 that is followed downstream by a reference mirror 24 and then a second beamsplitter 26. The reference mirror 24 includes a centrally located reflecting spot provided on its underside, but not shown. The second beamsplitter 26 divides the collimated beam into reference and object beams 30 and 32, respectively. The reference beam 30 reflects off the reference mirror 26 reflecting spot, and the object beam 32 off a vibrating object 28. Reference and object beams are recombined to form an apparently frozen interferogram in which phase differences are encoded as intensity variations.

A PZT scanner 40 moves the interferometric objective 20 vertically to scan through a range of optical path differences, effectively modulating the phase of the interference pattern. The interference pattern is passed by the 45-degree beamsplitter 18 through a focusing objective 34 toward a camera 36. The camera 36 acquires data during the scan. The acquired data is transferred via a link 44 to a computer 38 where it is stored and processed. Computer 38 also controls the scan via a link 42. Computer 38 is also provided with suitable software to implement data processing to be described, perform general housekeeping functions, and provide an operator interface and display.

The relationship between pulse width and the period of oscillation of an object is illustrated in FIG. 2. As shown qualitatively there, the pulse width, δ, should be much smaller than the period of oscillation, τ, of the object 28 and should be sufficiently small so that fringes are not blurred. For a more expanded description on the topic of pulse width, δ, reference may be had to, for example, Ken NAKANO, Kazuhiro HANE, Shigeru OKUMA and Tadashi EGUCHI in "Visualization of high-frequency surface acoustic wave propagation using stroboscopic phase-shift interferometry (Paper #: 3225-05) SPIE Proceedings Vol. 3225 Microlithography and Metrology in Micromachining III ISBN: 0-8194-2657-1, 142 pages (1997), the contents of which are incorporated herein by reference. However, as can be appreciated by those skilled in the art, the shorter the period of oscillation, τ, the shorter the pulse width, δ, needs to be. For any given period of oscillation, τ, there is a corresponding pulse width, δ, that will result in a small error after which one may relax the requirements on pulse width if larger errors are tolerable.

Interferograms thus generated are stored in the computer 38 during a scan of optical path length and are individually transformed into the spatial frequency domain by digital Fourier analysis. The transformed data now represents, for each pixel, the relative intensity and interferometric phase as a function of spatial frequency.

Figure 3:
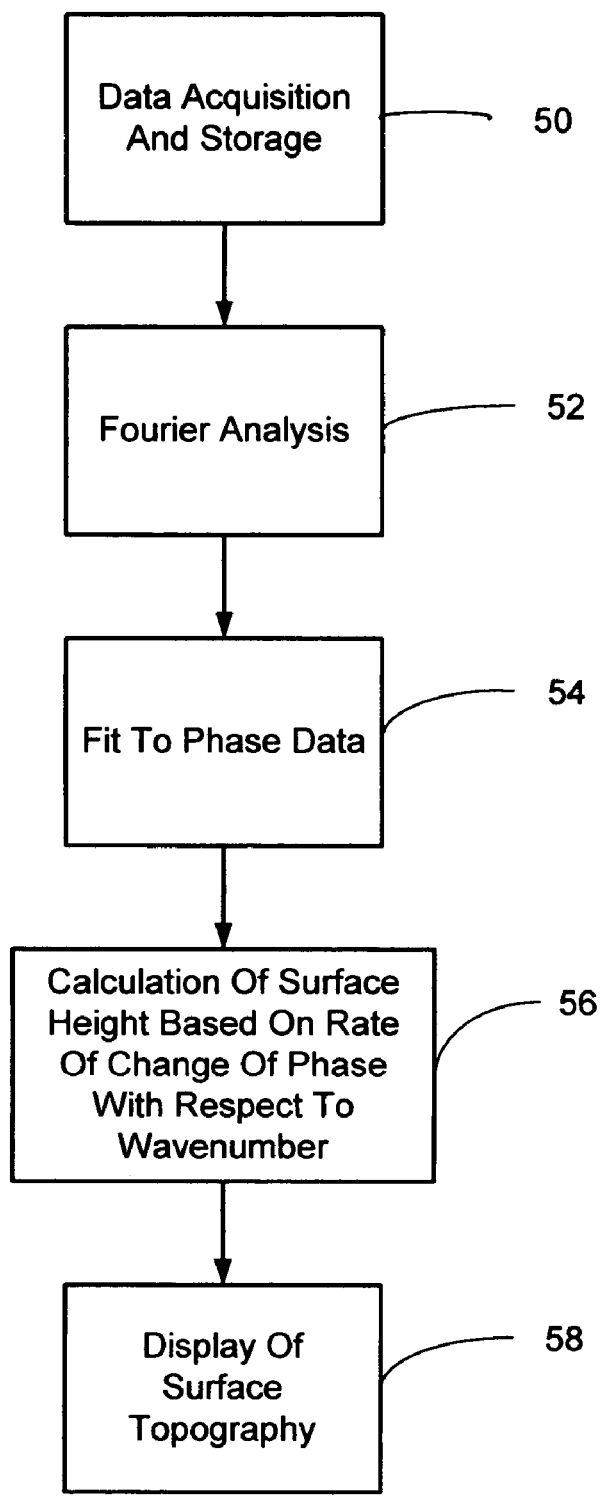
FIG. 3 is a high-level flow chart of the general methodology used in practicing the invention to acquire and reduce interferometric information to surface height.

The general methodology for data acquisition and reduction to measure the surface topography of a vibrating object is shown in FIG. 3. After the interferograms are acquired, each is then Fourier transformed to provide phase data. The phase data is then plotted against wavenumber or spatial frequency to provide a straight-line relationship between the two. The slope of this line and its intercept provide surface information in the manner set forth more particularly in U.S. Pat. No. 5,398,113 issued on Mar. 14, 1995 in the name of Peter de Groot with the title METHOD AND APPARATUS FOR SURFACE TOPOGRAPHY MEASUREMENT BY SPATIAL-FREQUENCY ANALYSIS OF INTERFEROGRAMS, the entire contents of which are incorporated herein by reference.

Briefly, however, the interferograms are acquired and stored (Block 50) in the computer 38 and are individually transformed into the spatial frequency domain by digital Fourier analysis (Block 52). For each pixel, the transformed data represents the relative intensity and interferometric phase as a function of spatial frequency. In a further step (Block 54), the spatial frequency data is examined to determine the mean wavelength and spectral distribution of the light that generated the interference pattern. The interferometric phase and/or magnitude as a function of wavenumber in the interferogram is analyzed to determine at least one characteristic of the surface. For example, phase may be determined by a least-squares polynomial fit to the transformed data. In a succeeding step (Block 56), heights for the surface points corresponding to the image pixels are calculated from the coefficients of the polynomial. The final step (Block 58) is the creation of a complete three-dimensional image constructed from the height data and corresponding image plane coordinates. The three-dimensional image may be displayed, rendered into a hard copy, or stored in any suitable medium designed for that purpose.

More particularly, after the data has been acquired, the computer 38 analyzes each of the stored interferograms to determine its composition in terms of wavenumbers and corresponding phases. Starting with a single-column array of N intensity values $I_i$ taken at equally spaced OPD positions $Z_l$, the contribution to a given interferogram for a particular wavenumber $k_j$ is calculated using the following mathematical relationship:

$$P_j = \Sigma I_i \cdot e^{ik_j z_i} \qquad \text{Equation 1}$$

The result $P_j$ is the $j^{th}$ component of the Fourier transform. The data processing technique therefore includes the step of either applying Equation 1 directly for the selected values of $k_j$, or obtaining a set of N/2 positive-wavenumber components by using specialized algorithms such, for example, as the well-known Fast Fourier Transform (FFT).

The results $P_j$ of the Fourier analysis consist of a list of complex numbers that can be expressed in the form $$P_j = |P_j| e^{i\phi_j} \qquad \text{Equation 2}$$

The transformed interferograms now represent, for each pixel, the relative intensity or strength $|P_j|$ and the interferometric phase $\phi_j$ as a function of wavenumber $k_j$. Most of the useful information in the Fourier-transformed data is contained in a region in which the relative intensities $|P_j|$ are large. Therefore, in accordance with a preferred method of the invention, a simple peak-finding search is performed to locate this region. Alternatively, if the scan rate and the spectral characteristics of the source are precisely known, the location of this region can be predicted. For example, a source having a mean emission wavelength of 500 nm will have a peak at wavenumber $k_0 = 2\pi/500$ nm Now, if the interferogram has 64 data points acquired at round-trip OPD intervals of exactly 125 nm, then wavenumber $k_0$ is equivalent to 16 cycles per 64-point scan.

Once the region of interest in the Fourier-transformed data is identified-either by prediction or by automated search—a series of data pairs $(\phi_j, k_j)$ is collected from this region for use in calculating the coefficient terms or parameters of the following equation:

$$\phi = k_0 \cdot Z_0 + (k - k_0) \cdot G_0 + \frac{(k-k_0)^2}{2} \cdot \frac{dG}{dk}|k_0 + \cdots |, \qquad \text{Equation 3}$$

where the distance, $G_0$, is known as the group-velocity OPD, and is equal to the so-called phase-velocity OPD $Z_0$ only after the special case of an interferometer that has been perfectly compensated for dispersion.

Equation 3 demonstrates that if the phase as a function of wavenumber is known in the neighborhood of the mean wavenumber $k_0$, it is then possible to recover phase-velocity OPD $Z_0$, the group-velocity OPD $G_0$, the rate of change of G with wavenumber and other terms of higher order, depending on the quality of the data.

The modulo $2\pi$ ambiguities in the phase data are removed by recursive application of the formula:

$$\phi_j = \phi_j - 2\pi \cdot Int\left\{\frac{\phi_j - \phi_j \pm 1}{2\pi}\right\} \qquad \text{Equation 4}$$

The ± relates to whether the recursion is in the direction of increasing or decreasing values of j. The function Int{ } returns the nearest integer to its argument, and is used to force continuity between adjacent phase values.

Next, a polynomial is fit to the $(\phi_j, k_j)$ data pairs in order to estimate the coefficient terms in Equation 3. The Block 54 in FIG. 3 also represents this step in the signal processing technique. A linear least squares fit polynomial is generally sufficient, unless a large amount of second-order dispersion is present in the interferogram in which case a quadratic fit may be appropriate. For the purpose of measuring surface topography, the slope and constant terms are of primary interest. In particular, the group-velocity OPD $G_0$ can be readily calculated from the phase slope and an inverted form of:

$$\frac{d\phi}{dk}\bigg|k_0 = Z_0 + k \cdot \frac{dZ}{dk}\bigg|k_0 = G_0 \qquad \text{Equation 5}$$

The relationship between the group-velocity OPD $G_0$ and the actual physical topography of a surface is governed by the group-velocity index $n_G$. A relative change $\Delta G$ in round-trip group-velocity OPD corresponds to a change $\Delta h$ in physical surface height according to the relationship:

$$\Delta h = \frac{\Delta G}{2n_G}. \qquad \text{Equation 6}$$

This calculation is performed for each pixel in the image, resulting in a three-dimensional $\Delta h(x,y)$ of the object surface topography, where x,y are the surface coordinates. This further step in the inventive signal processing technique appears in the Block 56 in FIG. 3.

An optional next step in processing of the data consists of improving the resolution of the measurement for each pixel through use of the constant term $k_0 z_0$, which appears in Equation 3. This constant term is obtained automatically as a consequence of the least-squares fit effected in the previous step, but its value is only known modulo $2\pi$. This difficulty is avoided by way of the following calculation, which utilizes the approximate Δh value calculated from the phase slope:

$$\Delta h' = \frac{1}{2n}\left[\frac{(\phi_0 - \alpha)}{k_0} - \frac{2\pi}{k_0}Int\left\{\frac{(\phi_0 - \alpha) - (2k_0 \cdot h \cdot n)}{2\pi}\right\}\right] \quad \text{Equation 7}$$

The quantity n is the index of refraction, sometimes referred to as a phase-velocity index of refraction to distinguish it from $n_G$. The constant phase offset α is due to factors such as spatial coherence phenomena and phase-change on reflection. Its value may for example be determined by calculation, by iterative application of Equation 7, by empirical methods such as those described in U.S. Pat. No. 5,402,234 issued on Mar. 28, 1995 and entitled "Method And Apparatus For The Rapid Acquisition Of Data In Coherence Scanning Interferometry", the disclosure of which is expressly incorporated by reference herein, or by some combination of these or other known methods.

The final step in the inventive signal processing technique is the construction of a representation of the object surface topography in the preferred form of an isometric, color-coded or cross-sectional graph in accordance with the results Δh(x,y) or Δh'(x,y), which may then be rendered in printed form or displayed on a computer monitor or the like. This step appears as the Block 58 in FIG. 3. Obvious additional processing steps, such as the calculation of surface figures, statistical parameters such as surface roughness, and the size of discontinuous features such as step heights, channels and relief patterns, are also within the intended scope and contemplation of the invention. For more details, reference, again, may be had to U.S. Pat. No. 5,398,113 issued on Mar. 14, 1995, the entire contents of which are incorporated herein by reference.

The inventive stroboscopic apparatus and method for measuring surface topography differs markedly and fundamentally from the prior art in that the wavelength drift is not a factor in the calculation of the height. The analysis takes place entirely in the spatial frequency domain, where the specific objectives of the invention are more readily achieved.

While features of the present invention have been described with reference to a particular embodiment, other changes will occur to those skilled in the art based on the teachings of the invention, and it is to be understood that such changes are intended to be within the scope of the invention.

I claim:

1. An interferometric stroboscopic method for topographically profiling a surface of a vibrating object, said method comprising the steps of:

illuminating the vibrating object surface and a reference surface in an interferometer with a series of pulses of illumination to produce an interference pattern on a two-dimensional detector optically aligned with the object surface and having a plurality of pixels each corresponding to a respective location on the object surface;

varying an optical path difference between the reference surface and the object surface to produce at each detector pixel an interferogram for a respective object surface location, each said interferogram being defined by a pixel-received variation in interference illumination intensity for the respective object surface location as the optical path difference is varied;

transforming each said interferogram into the spatial frequency domain to define, for each said pixel, transformed interferogram data, wherein said transformed interferogram data for each said pixel represents relative intensity and interferometric phase of the interferogram received at said each pixel as a function of spatial frequency;

calculating, for each said pixel, a height of the respective object surface location using said transformed interferogram data by determining the interferometric phase of the interferogram as a function of wavenumber using said transformed interferogram data; and creating a topographical profile of the object surface using the heights calculated in said prior step, said interferometric stroboscopic method being insensitive to changes in the wavelength of said pulses illuminating the vibrating object.

2. The interferometric stroboscopic method of claim 1 wherein said object is illuminated with a multiple color source.

3. The interferometric stroboscopic method of claim 2 wherein said multiple color source is selected from the group comprising LEDs and white light sources.

4. The method of claim 1, wherein said calculating step further comprises, for each said pixel:

(i) approximating the interferometric phase as a function of angular wavenumber by a least-squares polynomial fit to said transformed interferogram data; and (ii) calculating the height of the respective object surface location from coefficients of the polynomial.

5. An interferometric stroboscopic microscope apparatus for topographically profiling a surface of a vibrating object, said apparatus comprising:

an interferometric microscope having a reference surface;

a two-dimensional detector optically aligned with the object surface and having a plurality of pixels each corresponding to a respective location on the object surface;

a source for illuminating the vibrating object surface and reference surface in said interferometric microscope with a series of pulses of illumination to produce an interference pattern on two-dimensional detector;

means for varying an optical path difference between the reference surface and the object surface to produce at each detector pixel an interferogram for a respective object surface location, each said interferogram being defined by a pixel-received variation in interference illumination intensity for the respective object surface location as the optical path difference is varied; and means for:

(a) transforming each said interferogram into the spatial frequency domain to define, for each said pixel, transformed interferogram data, wherein said transformed interferogram data for each said pixel represents relative intensity and interferometric phase of the interferogram received at said each pixel as a function of spatial frequency;

(b) calculating, for each said pixel, a height of the respective object surface location using said transformed interferogram data by determining interferometric phase of the interferogram as a function of wavenumber using said transformed interferogram data; and (c) creating a topographical profile of the object surface using previously calculated heights, said interferometric stroboscopic microscope apparatus being insensitive to changes in the wavelength of said source pulses illuminating the vibrating object.

6. The interferometric stroboscopic microscope apparatus of claim 5 wherein said object is illuminated with a multiple color source.

7. The interferometric stroboscopic microscope apparatus of claim 6 wherein said multiple color source is selected from the group comprising LEDs and white light sources.

8. The interferometric stroboscopic microscope of claim 7 wherein said calculating means, for each said pixel, further:
(i) approximates the interferometric phase as a function of angular wavenumber by a least-squares polynomial fit to said transformed interferogram data; and
(ii) calculates the height of the respective object surface location from coefficients of the polynomial.

9. An interferometric stroboscopic apparatus for topographically profiling a surface of a vibrating object, said apparatus comprising:
an interferometric subsystem having a stroboscopic source for illuminating the surface with pulses to generate interferograms containing phase information about the height of the vibrating surface; and
means for analyzing said interferograms so that the measurement of the height of the surface is insensitive to changes in the wavelength of said stroboscopic source pulses illuminating the vibrating object.

10. The interferometric stroboscopic apparatus of claim 9 said source is a multiple wavelength source and said means for analyzing said interferograms utilizes frequency domain analysis (FDA).

* * * * *